United States Patent [19]
Hansen

[11] Patent Number: 5,935,510
[45] Date of Patent: Aug. 10, 1999

[54] METHOD FOR USING RECYCLED GLASS AS A FILLER IN MOLDED PLASTICS

[75] Inventor: Richard W. Hansen, Eagle, Id.

[73] Assignee: R & J Hansen, L.L.C., Salt Lake City, Utah

[21] Appl. No.: 08/967,718

[22] Filed: Nov. 10, 1997

Related U.S. Application Data

[60] Provisional application No. 60/036,197, Jan. 21, 1997.
[51] Int. Cl.$^6$ .................................................... B29C 7/90
[52] U.S. Cl. .................... 264/523; 264/310; 264/328.18; 264/349; 264/915; 264/917; 264/921
[58] Field of Search .............................. 264/15, 523, 310, 264/328.18, 915, 917, 921, 349

[56] References Cited

U.S. PATENT DOCUMENTS

| | | | |
|---|---|---|---|
| 3,597,177 | 8/1971 | Davidoff | 65/21 |
| 3,846,366 | 11/1974 | Wallace | 260/37 EP |
| 3,854,267 | 12/1974 | Weiant et al. | 52/744 |
| 3,976,608 | 8/1976 | Buckler et al. | 260/4 AR |
| 4,013,616 | 3/1977 | Wallace | 260/42.46 |
| 4,154,789 | 5/1979 | Delacoste | 264/138 |
| 4,213,851 | 7/1980 | White et al. | 209/12 |
| 4,564,491 | 1/1986 | Koestecki | 264/108 |
| 4,796,820 | 1/1989 | Hansen | 241/69 |
| 4,997,485 | 3/1991 | Lamoni | 106/753 |
| 5,184,781 | 2/1993 | Andela | 241/62 |
| 5,523,135 | 6/1996 | Shiwaku et al. | 428/35.7 |

FOREIGN PATENT DOCUMENTS

WO 96/23587  8/1996  WIPO.

OTHER PUBLICATIONS

"Summary of Markets for Recovered Glass," Office of Solid Waste, U.S. Environmental Protection Agency, (OS–305) (Dec. 1992).

"Markets for Recovered Glass," Office of Solid Waste, U.S. Environmental Protection Agency (OS–305) (Dec. 1992).

Paxton, Kip, "Mining Glass from the Waste Stream," Waste Glass Processing Center—A Tool for Economic Development, Institute of Materials Processing, Michigan Technological University, (www.imp.mtu.edu/newdocs/wgpc.html) (Date unknown).

*Primary Examiner*—Catherine Timm
*Attorney, Agent, or Firm*—Madson & Metcalf

[57] ABSTRACT

The use of comminuted, recycled glass powders as a filler in molded plastic parts is disclosed. The recycled glass preferably has rounded edges, which is a distinct advantage over conventional ground glass which has extremely sharp edges. Suitable comminuted glass is free from contaminants such as grinding compounds. The comminuted recycled glass filler can be used with a variety of different thermoplastics commonly used to in injection molding, rotational molding, and blow molding of plastic parts.

20 Claims, No Drawings

METHOD FOR USING RECYCLED GLASS AS A FILLER IN MOLDED PLASTICS

RELATED PATENT APPLICATION

This application claims the benefit of U.S. Provisional Application Ser. No. 60/036,197 entitled "Method for Using Recycled Glass as a Filler in Molded Plastics" filed Jan. 21, 1997, which application is incorporated herein by reference.

FIELD OF THE INVENTION

The present invention relates to the use of comminuted recycled glass as a filler in molded plastics.

BACKGROUND OF INVENTION

There is a continuing need in the art of manufacturing plastic parts to reduce the manufacturing costs while maintaining product quality. Many different types of plastic fillers have been proposed for use with molded plastics, but all have failed for one or more reasons. This is particularly true for rotational molded parts.

For instance, organic materials, such as crushed nut shells, produce harmful gasses at typical molding temperatures of 550° F. to 700° F. Sand has also been tried as a filler, but it does not mold well because it does not disperse evenly through out the plastic. Instead, sand tends to migrate to the inside of rotational molded parts. It does not bond well with the plastic and sheds quickly. Sand is also hard on the mixing equipment. Commercially available glass beads and wiskers are often used with injection molded plastics. They have been used with varying degrees of success in rotational molded plastics because the glass does not mix well and simply balls up on the inside of the rotating mold. As used herein, a plastic "filler" is an ingredient which has a cost substantially less than the cost of the plastic used to mold the product.

As mentioned above, specially manufactured glass has been used as an ingredient in injection and rotational molded plastic parts. For instance, commercially available glass fibers or whiskers, having a length of about ¼ inch, have been added to plastic to make the product tougher and to improve the yield stress. Manufactured glass beads (either solid or hollow) have also been used in injection and rotational molded plastics to improve to toughness and abrasion resistance of the product. However, the manufactured glass fibers and beads cost approximately the same as the plastic used to mold the product. The manufactured glass fibers and beads have been used solely to provide desired mechanical properties in the finished plastic product. They have not been used as a filler in plastic to reduce manufacturing costs.

It would be a significant advancement in the art to provide a true filler for molded plastic parts which can be used to lower the manufacturing cost of molded plastics, particularly rotational molded plastics. It would also be an advancement in the art to provide a filler for molded plastic parts which enhances certain mechanical properties of the part.

Such a filler for molded plastic parts is disclosed herein.

SUMMARY OF THE INVENTION

The present invention is directed to the use of comminuted, recycled glass powders as a filler in molded plastic parts. Suitable recycled glass powder is preferably free from contaminants, such as grinding compounds, and has non-uniform, rounded edges. The glass particles include striations between particle edges which enhance the plastic bond to the glass particles. The comminuted recycled glass filler is preferably used with thermoplastic resins commonly used to in injection molding, rotational molding, and blow molding of plastic parts. The comminuted recycled glass preferably has a particle size in the range from about 20 mesh to about 200 mesh, and more preferably in the range from 80 to 100 mesh.

Comminuted recycled glass can be added to plastic resin in concentrations up to 25% by weight, and preferably from 10% to 25% by weight, and most preferably from 15% to 20% by weight. Because comminuted recycled glass costs substantially less than the cost of the raw resin used to manufacture plastic parts, the glass functions as a useful low-cost filler.

It has been found that glass filled plastic parts show improved abrasion resistance and flex modulus compared to unfilled parts. However, glass filled plastic parts possess lower impact resistance compared to unfilled parts. The amount of glass filler in the plastic part can be tailored to provide the desired abrasion resistance and flex modulus and still maintain acceptable impact resistance.

DESCRIPTION OF THE INVENTION

The present invention is directed to the use of comminuted recycled glass powders as a filler in molded plastic parts. Suitable recycled glass powder can be obtained using the methods and apparatus described in WO 96/23587 entitled "Methods for Recycling Glass and Uses of Recycled Glass" and application Ser. No. 60/048,648 entitled "Apparatus for Comminuting Glass" filed Jun. 5, 1997 (hereinafter "the '648 application"), which are incorporated herein by reference. The disclosed method quickly and inexpensively converts waste glass into a form which can be safely handled. The process involves "suspended attrition" in which the glass particles are suspended by rotating hammers and are caused to roll within a suspension chamber defined by the rotating hammers and by an adjustable plate. Importantly, the recycled glass according to WO 96/23587 and the '648 application has rounded edges, which is a distinct advantage over conventional ground glass which has extremely sharp edges. Advantageously, the comminuted glass disclosed in WO 96/23587 and the '648 application is free from contaminants such as grinding compounds.

The comminuted recycled glass filler can be used with a variety of different thermoplastics including ABS (acrylonitrile-butadiene-styrene) resins, acrylics, chlorinated polyethers, fluorocarbons, nylons (polyamides), polycarbonates, polyethylenes, polypropylenes, polystyrenes, and vinyls.

As used herein, the term "glass" encompasses all inorganic products which have cooled to a rigid solid without undergoing crystallization. The term "glass" is also intended to include other glassy materials including ceramic materials such as porcelain. The comminuted recycled glass will typically have a particle size in the range from about 20 mesh to about 200 mesh, although smaller glass particles and powders can be used. As used herein, comminuted recycled glass is intended to include comminuted manufactured glass having rounded edges, regardless of the origin of the glass.

In some applications, the comminuted recycled glass may be sprayed or coated with a wetting agent such as TSPP to enhance mixing with the plastic.

It has been found that comminuted recycled glass can be used as a filler in molded plastic parts. Recycled glass is very inexpensive, currently costing about $0.15/pound, while typical plastic resin costs between $0.55/pound to $0.90/pound. Comminuted recycled glass can be added to plastic in concentrations up to 25% by weight, and preferably from 10% to 25% by weight, and most preferably from 15% to 20% by weight. Thus, it is possible to substantially reduce the manufacturing cost of plastic parts by using comminuted recycled glass as a filler.

Molded plastic parts containing glass filler possess improved abrasion resistance compared to unfilled parts. However, glass filled plastic parts possess lower impact resistance compared to unfilled parts. The user must balance the improved abrasion resistance with the lower impact resistance. In practice, one would maximize the glass filler content while maintaining an acceptable impact resistance.

Advantageously, comminuted recycled glass can be used in a variety of different molding techniques, including injection molding and rotational molding applications. The present invention is particularly useful in reducing the manufacturing costs of large rotational molded plastic parts.

As an added benefit, it has been observed that when larger particle sizes are used, such as about 20 mesh, the glass particles tend to migrate towards the inside surface of large rotational molded parts providing a unique non-skid surface.

An unexpected advantage of using the recycled comminuted glass as a filler in rotational molded plastic parts is that the oven cycle time can be shortened. Normally in rotational molding, the shot weight of plastic is placed inside a mold and the mold is rotated inside an oven for a given time period. While in the oven, the plastic melts and coats the inside surface of the mold. After a sufficient time has passed within the oven, the mold is removed from the oven and allowed to cool. It has been found that when a glass filler is used, the required time within the oven can be reduced approximately 20%. While not being bound by theory, it is presently believed that the oven cycle time is reduced because the glass retains the oven heat after the mold is removed from the oven for sufficient time to allow the final outside of the oven.

As an example, a 155 gallon tub is normally rotational molded using a plastic shot weight of from 80 to 90 pounds of high and low density polyethylene and an oven cycle time of about 15 minutes. The identical 155 gallon tub can be rotational molded using 68 pounds of plastic and 12 pounds of recycled glass and an oven cycle time of about 12 minutes. When one considers that the oven is a 2.5 million BTU oven consuming large amounts of fuel, a 20% reduction of the oven heating requirements is substantial and unexpected. Furthermore, with a quicker oven cycle time, more parts can be manufactured with the same mold in a given amount of time.

EXAMPLE 1

A comparison was made of various mechanical properties of molded plastic parts made with virgin plastic resin and with the same plastic resin containing 15% comminuted glass filler and 20% glass filler, by weight. The plastic resin was a linear low density polyethylene. The glass filler had a size in the range from 80 to 100 mesh, and it had rounded edges. Elongation, flex modulus, tensile strength, and impact resistance were measured. The results are reported below:

| Mechanical Property | Raw Resin | 15% Glass | 20% Glass |
|---|---|---|---|
| Elongation† | 765% | 44% | 35% |
| Flex Modulus‡ | 503 MPa | 800 MPa | 668 MPa |
| Tensile Strength† | 15.5 MPa | 15.1 MPa | 12.8 MPa |
| Impact Resistance | 6 feet | 2.5 feet | failed |

†break at 2 inches/minute.
‡1% secant at 0.05 inches/minute.

The impact resistance was measured by freezing the molded plastic part to −40° C. and dropping a 10 pound dart on the plastic part. The height at which failure first occurred is reported. It is important to recognize that failure in the impact resistance test does not mean that the plastic part cannot be useful. Plastic parts which will not be subjected to freezing conditions can have very low impact resistance and still be useful.

High density plastic resins can be used to mold plastic parts. However, if the density of the plastic resin is substantially greater than the density of the comminuted glass particles, the glass tends to "float" in the resin and not disperse well. For instance, when rotational molding with high density plastics, the glass particles tend to migrate to the interior surface of the plastic part.

From the foregoing, one will appreciate that comminuted recycled glass can be used as a low cost filler in molded plastic parts. As a result, the manufacturing cost of such molded parts can be substantially lowered. The comminuted glass filler can also be used to enhance the abrasion resistance, flex, and tensile strengths of the molded plastic parts.

It should be appreciated that the methods of the present invention are capable of being incorporated in the form of a variety of embodiments, only a few of which have been illustrated and described above. The invention may be embodied in other forms without departing from its essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for using comminuted, recycled glass as a filler in molded plastic parts comprising:
   obtaining a quantity of uncontaminated, comminuted, recycled glass particulate filler having non-uniform, rounded edges which has been comminuted without the use of grinding compounds;
   combining the comminuted glass particulate filler with a quantity of thermoplastic resin; and
   molding a plastic part with the thermoplastic resin and the comminuted glass particulate filler, wherein the plastic part comprises up to 25% by weight comminuted glass particulate filler.

2. A method for using comminuted, recycled glass as a filler in molded plastic parts as defined in claim 1, wherein the plastic part comprises between 10% and 20% by weight comminuted glass particulate filler.

3. A method for using comminuted, recycled glass as a filler in molded plastic parts as defined in claim 1, wherein the plastic part comprises between 15% and 20% by weight comminuted glass particulate filler.

4. A method for using comminuted, recycled glass as a filler in molded plastic parts as defined in claim 1, wherein the comminuted glass particulate filler has a particle size less than about 20 mesh.

5. A method for using comminuted, recycled glass as a filler in molded plastic parts as defined in claim 1, wherein the comminuted glass particulate filler has a particle size in the range from about 20 mesh to about 200 mesh.

6. A method for using comminuted, recycled glass as a filler in molded plastic parts as defined in claim 1, wherein the comminuted glass particulate filler has a particle size in the range from about 80 mesh to about 100 mesh.

7. A method for using comminuted, recycled glass as a filler in molded plastic parts as defined in claim 1, wherein the thermoplastic resin is selected from ABS (acrylonitrile-butadiene-styrene) resins, acrylic resins, chlorinated polyether resins, fluorocarbon resins, nylon (polyamide) resins, polycarbonate resins, polyethylene resins, polypropylene resins, polystyrene resins, and vinyl resins.

8. A method for using comminuted, recycled glass as a filler in molded plastic parts as defined in claim 1, wherein the molding step comprises injection molding.

9. A method for using comminuted, recycled glass as a filler in molded plastic parts as defined in claim 1, wherein the molding step comprises rotational molding.

10. A method for using comminuted, recycled glass as a filler in molded plastic parts as defined in claim 1, wherein the molding step comprises blow molding.

11. A method for using comminuted, recycled glass as a filler in rotational molded plastic parts comprising:

obtaining a quantity of uncontaminated, comminuted, recycled glass particulate filler having non-uniform, rounded edges which has been comminuted without the use of grinding compounds, wherein the comminuted glass particulate filler has a particle size less than about 20 mesh;

combining the comminuted glass particulate filler with a quantity of thermoplastic resin; and rotational molding a plastic part with the thermoplastic resin and the comminuted glass particulate filler, wherein the plastic part comprises between 10% and 20% by weight comminuted glass particulate filler.

12. A method for using comminuted, recycled glass as a filler in molded plastic parts as defined in claim 11, wherein the plastic part comprises between 15% and 20% by weight comminuted glass particulate filler.

13. A method for using comminuted, recycled glass as a filler in molded plastic parts as defined in claim 11, wherein the comminuted glass particulate filler has a particle size in the range from about 20 mesh to about 200 mesh.

14. A method for using comminuted, recycled glass as a filler in molded plastic parts as defined in claim 11, wherein the comminuted glass particulate filler has a particle size in the range from about 80 mesh to about 100 mesh.

15. A method for using comminuted, recycled glass as a filler in molded plastic parts as defined in claim 11, wherein the thermoplastic resin is selected from ABS (acrylonitrile-butadiene-styrene) resins, acrylic resins, chlorinated polyether resins, fluorocarbon resins, nylon (polyamide) resins, polycarbonate resins, polyethylene resins, polypropylene resins, polystyrene resins, and vinyl resins.

16. A method for using comminuted, recycled glass as a filler in molded plastic parts as defined in claim 11, wherein the comminuted glass particulate filler is obtained using an apparatus which suspends the glass particles and causes them to roll against each other.

17. A method for using recycled glass powder as a filler in molded plastic parts comprising:

obtaining a quantity of uncontaminated, comminuted, recycled glass powder filler having non-uniform rounded edges which has been comminuted without the use of grinding compounds, wherein the glass powder has a size less than about 20 mesh;

combining the comminuted glass powder filler with a quantity of plastic resin; and molding a plastic part with the plastic resin and the comminuted glass powder filler, wherein the plastic part comprises up to 25% by weight comminuted glass powder filler.

18. A method for using recycled glass powder as defined in claim 17, wherein the comminuted glass powder filler has a particle size in the range from about 20 mesh to about 200 mesh.

19. A method for using recycled glass powder as defined in claim 17, wherein the comminuted glass powder filler has a particle size in the range from about 80 mesh to about 100 mesh.

20. A method for using recycled glass powder as defined in claim 17, wherein the plastic resin is a thermoplastic resin selected from ABS (acrylonitrile-butadiene-styrene) resins, acrylic resins, chlorinated polyether resins, fluorocarbon resins, nylon (polyamide) resins, polycarbonate resins, polyethylene resins, polypropylene resins, polystyrene resins, and vinyl resins.

* * * * *